(12) United States Patent
Berlin

(10) Patent No.: US 9,505,964 B2
(45) Date of Patent: Nov. 29, 2016

(54) BINDER COMPOSITIONS COMPRISING LIGNIN DERIVATIVES

(71) Applicant: Fibria Innovations Inc., Vancouver (CA)

(72) Inventor: Alex Berlin, Burnaby (CA)

(73) Assignee: FIBRIA INNOVATIONS INC., Vancouver, British Columbia (CA)

( * ) Notice: Subject to any disclaimer, the term of this patent is extended or adjusted under 35 U.S.C. 154(b) by 0 days.

(21) Appl. No.: 14/798,396

(22) Filed: Jul. 13, 2015

(65) Prior Publication Data

US 2015/0315439 A1    Nov. 5, 2015

Related U.S. Application Data

(63) Continuation of application No. 13/584,651, filed on Aug. 13, 2012, now abandoned, which is a continuation of application No. PCT/CA2011/000182, filed on Feb. 15, 2011.

(60) Provisional application No. 61/304,745, filed on Feb. 15, 2010, provisional application No. 61/304,742, filed on Feb. 15, 2010.

(30) Foreign Application Priority Data

May 27, 2010    (CA) .................. PCT/CA2010/000800

(51) Int. Cl.
| | | |
|---|---|---|
| *C09J 197/00* | (2006.01) | |
| *D21J 1/04* | (2006.01) | |
| *C08L 97/00* | (2006.01) | |
| *C09J 161/06* | (2006.01) | |

(52) U.S. Cl.
CPC ............ *C09J 197/005* (2013.01); *C08L 97/00* (2013.01); *C09J 161/06* (2013.01); *D21J 1/04* (2013.01)

(58) Field of Classification Search
CPC ...... C09J 197/005; C09J 161/06; D21J 1/04; C08L 97/00
See application file for complete search history.

(56) References Cited

U.S. PATENT DOCUMENTS

| | | |
|---|---|---|
| 2,934,531 A | 4/1960 | Gardon et al. |
| 4,279,788 A | 7/1981 | Lambuth |
| 4,486,557 A | 12/1984 | Gaul et al. |
| 4,968,771 A | 11/1990 | Baxter |
| 5,373,070 A | 12/1994 | Gardziella et al. |
| 5,382,608 A | 1/1995 | Gardzielia et al. |
| 2002/0143085 A1 | 10/2002 | Yoshida et al. |
| 2009/0069550 A1 | 3/2009 | Belanger et al. |

FOREIGN PATENT DOCUMENTS

| | | |
|---|---|---|
| CA | 1136326 A1 | 11/1982 |
| CA | 2214013 A1 | 7/1997 |

OTHER PUBLICATIONS

International Search Report and Written Opinion mailed Apr. 21, 2011 for PCT/CA2011/000182.
International Preliminary Report on Patentability mailed Aug. 30, 2012 for PCT/CA2011/000182.
Cateto et al. Lignins as Macromonomers for Polyurethane Synthesis: A Comparative Study on Hydroxyl Group Determination. Journal of Applied Polymer Science, 2008, vol. 109, pp. 3009-3017.

*Primary Examiner* — John Uselding
(74) *Attorney, Agent, or Firm* — Perkins Coie LLP; Viola T. Kung

(57) ABSTRACT

The present disclosure provides an adhesive composition comprising derivatives of native lignin and an isocyanate-based binder such as methylene diphenyl diisocyanate. The present compositions may further comprise formaldehyde-based resins such as PF, UF, and MF. While not wishing to be bound by theory, it is believed that incorporating derivatives of native lignin in isocyanate compositions will reduce incidence of pre-curing.

7 Claims, No Drawings

BINDER COMPOSITIONS COMPRISING LIGNIN DERIVATIVES

This application is a continuation of U.S. application Ser. No. 13/584,651, filed Aug. 13, 2012; which is a continuation of PCT/CA2011/000182, filed Feb. 15, 2011; which claims the priority of U.S. Provisional Application No. 61/304,745, filed Feb. 15, 2010; U.S. Provisional Application No. 61/304,742, filed Feb. 15, 2010; and PCT/CA2010/000800, filed May 27, 2010. The contents of the above-identified applications are incorporated herein by reference in their entirety.

TECHNICAL FIELD

This disclosure relates to derivatives of native lignin recovered from lignocellulosic feedstocks, and industrial applications thereof. More particularly, this disclosure relates to compositions, uses, processes and methods utilizing derivatives of native lignin.

BACKGROUND

Native lignin is a naturally occurring amorphous complex cross-linked organic macromolecule that comprises an integral component of all plant biomass. The chemical structure of lignin is irregular in the sense that different structural units (e.g., phenylpropane units) are not linked to each other in any systematic order. It is known that native lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures i.e. guaiacyl monolignol, syringyl monolignol and p-hydroxyphenyl monolignol, respectively, that are polymerized via specific linkages to form the native lignin macromolecule.

Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e. hardwood lignins, softwood lignins, and annual fibre lignins.

Native lignins are partially depolymerized during the pulping processes into lignin fragments which are soluble in the pulping liquors and subsequently separated from the cellulosic pulps. Post-pulping liquors containing lignin and polysaccharide fragments, and other extractives, are commonly referred to as "black liquors" or "spent liquors", depending on the pulping process. Such liquors are generally considered a by-product, and it is common practice to combust them to recover some energy value in addition to recovering the cooking chemicals. However, it is also possible to precipitate and/or recover lignin derivatives from these liquors. Each type of pulping process used to separate cellulosic pulps from other lignocellulosic components produces lignin derivatives that are very different in their physico-chemical, biochemical, and structural properties.

Given that lignin derivatives are available from renewable biomass sources there is an interest in using these derivatives in certain industrial processes. For example, U.S. Pat. No. 5,173,527 proposes using lignin-cellulosic materials in phenol-formaldehyde resins. A. Gregorova et al. propose using lignin in polypropylene for it radical scavenging properties (A. Gregorova et al., Radical scavenging capacity of lignin and its effect on processing stabilization of virgin and recycled polypropylene, Journal of Applied Polymer Science 106-3 (2007) pp. 1626-1631).

However, large-scale commercial application of the extracted lignin derivatives, particularly those isolated in traditional pulping processes employed in the manufacture of pulp and paper, has been limited due to, for example, the inconsistency of their chemical and functional properties. This inconsistency may, for example, be due to changes in feedstock supplies and the particular extraction/generation/recovery conditions. These issues are further complicated by the complexity of the molecular structures of lignin derivatives produced by the various extraction methods and the difficulty in performing reliable routine analyses of the structural conformity and integrity of recovered lignin derivatives. Nevertheless efforts continue to use lignin derivatives on a commercial scale.

For many years fibreboard products have been manufactured from wood or agricultural substrates using various adhesives. Formaldehyde-based resins such as phenol formaldehyde (PF), urea formaldehyde (UF) and melamine formaldehyde (MF) are extremely common and used for a variety of purposes such as manufacturing of housing and furniture panels such as medium density fibreboard (MDF), oriented strand board (OSB), plywood, and particleboard. Concerns about the toxicity of formaldehyde have led regulatory authorities to mandate the reduction of formaldehyde emissions (e.g. California Environmental Protection Agency Airborne Toxic Control Measure (ATCM) to Reduce Formaldehyde Emissions from Composite Wood Products, Apr. 26, 2007). There have been attempts to add lignin derivatives to formaldehyde-based resins. However, such attempts have not been entirely successful. For example, past attempts at adding Alcell® lignin to PF resins have been largely unsuccessful due to the relatively poor performance characteristics of the final product where the normalized Alcell® lignin-PF resin bond strength at 150° C. was 3,079 MPa*cm$^2$/g as tested by the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings 30$^{th}$ Annual Meeting of The Adhesion Society, Inc., Feb. 18-21, 2007, Tampa Bay, Fla., USA). These values are significantly lower than the current commercial adhesives. For instance, plywood or OSB made with PF resins are expected to have a bond strength in the region of 3,200-3,600 MPa*cm$^2$/g. Furthermore, lignin-containing PF-resins often do not cure quickly enough or completely enough under normal production conditions for fibreboard. This lack of cure-speed and lack of bond strength has limited the amount of lignin derivative that has been included in the formaldehyde-resins to relatively low levels.

An adhesive should meet certain criteria in order to be acceptable for industrial use. For example, the adhesive will preferably be available in a stable form such as a spray-dried powder or stable liquid. The adhesive will preferably set quickly enough to enable its use as a core adhesive for thick multi-layer panels but should not suffer from excessive "pre-cure".

Methylene diphenyl diisocyanate (MDI) is a widely used diisocyanate commonly used in the manufacture of polyurethanes and as an adhesive. MDI has the advantage that it is highly reactive and has strong bondability as well as being formaldehyde free. MDI polymerizes in the presence of water which reduce the ecological risks associated with its use.

It is known to use isocyanate-based binders such as MDI for fibreboard (see, for example, U.S. Pat. No. 6,692,670) but they have not, to date, been widely adopted for various reasons such as cost, cure-rate, and the need for release-agents to avoid the board sticking to the press-plates.

A significant issue with the use of MDI is its high sensitivity to moisture and temperature. In many manufacturing processes MDI suffers from significant premature polymerization (pre-cure) leading to substantial loss of resin efficiency and, hence, higher resin consumption. It is estimated that as much as 10% of the MDI may be lost to pre-curing leading to increased costs and decreased process efficiency.

SUMMARY

The present disclosure provides an adhesive composition comprising derivatives of native lignin and an isocyanate-based binder such as methylene diphenyl diisocyanate. The present compositions may further comprise formaldehyde-based resins such as PF, UF, and MF. While not wishing to be bound by theory, it is believed that incorporating derivatives of native lignin in isocyanate compositions will reduce incidence of pre-curing.

As used herein, the terms "methylene diphenyl diisocyanate" and "MDI" encompass oligomers of methylene diphenyl diisocyanate sometimes referred to as "pMDI" or "polymethylene polyphenylene polyisocyanate"

As used herein, the term "native lignin" refers to lignin in its natural state, in plant material.

As used herein, the terms "lignin derivatives" and "derivatives of native lignin" refer to lignin material extracted from lignocellulosic biomass. Usually, such material will be a mixture of chemical compounds that are generated during the extraction process.

This summary does not necessarily describe all features of the invention. Other aspects, features and advantages of the invention will be apparent to those of ordinary skill in the art upon review of the following description of specific embodiments of the invention.

DETAILED DESCRIPTION

The present disclosure provides compositions comprising isocyanate-based binder such as methylene diphenyl diisocyanate (MDI) and derivatives of native lignin. MDI compositions comprising lignin derivatives suffer from a lower incidence of pre-cure. While not wishing to be bound by theory, lignin derivatives may reduce the sensitivity of MDI to moisture and temperature, the latter being factors responsible for early MDI polymerization ("precure"). The incorporation of lignin in MDI can be problematic due to the instability and irregularity of the resulting lignin-containing MDI resins. The present compositions may comprise formaldehyde-based resins comprising lignin derivatives such as lignin-phenol formaldehyde (LPF). It is believed that the presence of isocyanate-based binder improves the cure-speed of the LPF making it more suitable for industrial applications such as an adhesive for the core of a multi-layer fibreboard. It is further believed that the presence of isocyanate-based binder allows increased amounts of the formaldehyde-based resin to be substituted with lignin derivative. For example, the present compositions may comprise 30% or more, 35% or more, 40% or more, by weight of lignin derivative.

Any suitable isocyanate-based binder. For example, polymeric MDI (polymethylene polyphenylene polyisocyanate) such as emulsifiable, polymeric MDI's may be used. Examples of commercially available polymeric MDI include I-Bond® and Rubinate® such as Rubinate 1840 isocyanate, Rubinate M isocyanate, Rubinate 1780 isocyanate, available from Huntsman Polyurethanes located in West Deptford, N.J. The MDI preferably has a diisocyanate content of about 50% or less, about 48% or less, about 45% or less, about 40% or less, by weight.

The polymeric MDI may also contain urethane modifications, isocyanurate modifications, biurets, ureas, etc. The polymeric MDI may be modified to be water dispersible, and applied in an aqueous emulsion form. Such a method for modifying the polymeric MDI to be water dispersible is fully disclosed in the above-identified U.S. Pat. No. 3,996,154.

The polymeric MDI may be used alone, or in conjunction with other binder materials, including, but not limited to, formaldehyde containing binder materials, diluents, extenders, fillers, etc. Suitable extenders include, for example, oils, such as soy oil and linseed oil, solvents, lignin, carbohydrates, etc. Suitable fillers include, for example, fibreglass, plastics, waste materials, etc. Moreover, the polymeric MDI may also include fire retardants, such as, for example, ammonium polyphosphates, trichloropropyl phosphate (TCPP), melamine, triphenyl phosphate, etc. Furthermore, the polymeric MDI may also include suitable release agents, such as, for example, soaps, fatty acids, waxes, silicones, fatty acid salts, etc.

Additionally, the polymeric MDI may also include biocides, such as boric acid, etc.

The present disclosure provides derivatives of native lignin recovered during or after pulping of lignocellulosic feedstocks. The pulp may be from any suitable lignocellulosic feedstock including hardwoods, softwoods, annual fibres, and combinations thereof.

Hardwood feedstocks include *Acacia*; Afzelia; Synsepalum duloificum; Albizia; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya* glabra, Carya ovata, Carya laciniosa); Hornbeam; Hophornbeam; Ipe; Iroko; Ironwood (e.g. *Bangkirai, Carpinus caroliniana, Casuarina equisetifolia, Choricbangarpia subargentea, Copaifera* spp., *Eusideroxylon zwageri, Guajacum officinale, Guajacum sanctum, Hopea odorata,* Ipe, *Krugiodendronferreum, Lyonothamnus lyonii* (*L. floribundus*), *Mesua ferrea, Olea* spp., *Olneya tesota, Ostrya virginiana, Parrotia persica, Tabebuia serratifolia*); Jacarandá; Jotoba; Lacewood; Laurel; Limba; Lignum vitae; Locust (e.g. *Robinia pseudacacia, Gleditsia triacanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus muhlenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoumé; Oregon Myrtle; California Bay Laurel; Pear; Poplar (e.g. *P. balsamifera, P. nigra,* Hybrid Poplar (*Populus×canadensis*)); Ramin; Red cedar; Rosewood; Sal; Sandalwood; *Sassafras*; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks for the present disclosure may be selected from *Acacia*, Aspen, Beech, *Eucalyptus*, Maple, Birch, Gum, Oak, Poplar, and combinations/hybrids thereof. The hardwood feedstocks for the present disclosure may be selected from *Populus* spp. (e.g. *Populus tremuloides*), *Eucalyptus* spp. (e.g. *Eucalyptus globulus*), *Acacia* spp. (e.g. *Acacia dealbata*), and combinations/hybrids thereof.

Softwood feedstocks include *Araucaria* (e.g. *A. cunninghamii, A. angustifolia, A. araucana*); softwood Cedar (e.g. *Juniperus virginiana, Thuja plicata, Thuja occidentalis, Chamaecyparis thyoides Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European Yew; Fir (e.g. *Abies balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*); Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks for the present disclosure may be selected from loblolly pine (*Pinus taeda*), radiata pine, jack pine, spruce (e.g., white, interior, black), Douglas fir, *Pinus silvestris, Picea abies*, and combinations/hybrids thereof. The softwood feedstocks for the present disclosure may be selected from pine (e.g. *Pinus radiata, Pinus taeda*); spruce; and combinations/hybrids thereof.

Annual fibre feedstocks include biomass derived from annual plants, plants which complete their growth in one growing season and therefore must be planted yearly. Examples of annual fibres include: flax, cereal straw (wheat, barley, oats), sugarcane bagasse, rice straw, corn stover, hemp, fruit pulp, alfa grass, switchgrass, and combinations/hybrids thereof. Industrial residues like corn cobs, fruit peals, seeds, etc. may also be considered annual fibres since they are commonly derived from annual fibre biomass such as edible crops and fruits. For example, the annual fibre feedstock may be selected from wheat straw, corn stover, corn cobs, sugar cane bagasse, and combinations/hybrids thereof.

The derivatives of native lignin will vary with the type of process used to separate native lignins from cellulose and other biomass constituents. Preparations very similar to native lignin can be obtained by (1) solvent extraction of finely ground wood (milled-wood lignin, MWL) or by (2) acidic dioxane extraction (acidolysis) of wood. Derivatives of native lignin can be also isolated from biomass pre-treated using (3) steam explosion, (4) dilute acid hydrolysis, (5) ammonia fibre expansion, (6) autohydrolysis methods. Derivatives of native lignin can be recovered after pulping of lignocellulosics including industrially operated (3) kraft and (4) soda pulping (and their modifications) and (5) sulphite pulping. In addition, a number of various pulping methods have been developed but not industrially introduced. Among them four major "organosolv" pulping methods tend to produce highly-purified lignin mixtures. The first organosolv method uses ethanol/solvent pulping (aka the Alcell® process); the second organosolv method uses alkaline sulphite anthraquinone methanol pulping (aka the "ASAM" process); the third organosolv process uses methanol pulping followed by methanol, NaOH, and anthraquinone pulping (aka the "Organocell" process); the fourth organosolv process uses acetic acid/hydrochloric acid or formic acid pulping (aka the "Acetosolv" process).

It should be noted that kraft pulping, sulphite pulping, and ASAM organosolv pulping will generate derivatives of native lignin containing significant amounts of organically-bound sulphur which may make them unsuitable for certain uses. Acid hydrolysis, soda pulping, steam explosion, Alcell® pulping, Organocell pulping, and Acetosolv pulping will generate derivatives of native lignin that are sulphur-free or contain low amounts of inorganic sulphur.

Organosolv processes, particularly the Alcell® process, tend to be less aggressive and can be used to separate highly purified lignin derivatives and other useful materials from biomass without excessively altering or damaging the native lignin building blocks. Such processes can therefore be used to maximize the value from all the components making up the biomass. Organosolv extraction processes however typically involve extraction at higher temperatures and pressures with a flammable solvent compared to other industrial processes and thus are generally considered to be more complex and expensive.

A description of the Alcell® process can be found in U.S. Pat. No. 4,764,596 (herein incorporated by reference). The process generally comprises pulping or pre-treating a fibrous biomass feedstock with primarily an ethanol/water solvent solution under conditions that include: (a) 60% ethanol/40% water, (b) temperature of about 180° C. to about 210° C., (c) pressure of about 20 atm to about 35 atm, and (d) a processing time of 5-120 minutes. Derivatives of native lignin are fractionated from the native lignins into the pulping liquor which also receives solubilised hemicelluloses, other carbohydrates and other extractives such as resins, organic acids, phenols, and tannins. Organosolv pulping liquors comprising the fractionated derivatives of native lignin and other extractives from the fibrous biomass feedstocks, are often called "black liquors". The organic acid and extractives released by organosolv pulping significantly acidify the black liquors to pH levels of about 5 and lower. After separation from the cellulosic pulps produced during the pulping process, the derivatives of native lignin are recovered from the black liquors by depressurization followed by flashing with cold water which will cause the fractionated derivatives of native lignin to precipitate thereby enabling their recovery by standard solids/liquids separation processes. Various disclosures exemplified by U.S. Pat. No. 7,465,791 and PCT Patent Application Publication No. WO 2007/129921, describe modifications to the Alcell organosolv process for the purposes of increasing the yields of fractionated derivatives of native lignin recovered from fibrous biomass feedstocks during biorefining. Modifications to the Alcell organosolv process conditions included adjusting: (a) ethanol concentration in the pulping liquor to a value selected from a range of 35%-85% (w/w) ethanol, (b) temperature to a value selected from a range of 100° C. to 350° C., (c) pressure to a value selected from a range of 5 atm to 35 atm, and (d) processing time to a duration from a range of 20 minutes to about 2 hours or longer, (e) liquor-to-wood ratio of 3:1 to 15:1 or higher, (f) pH of the cooking liquor from a range of 1 to 6.5 or higher if a basic catalyst is used.

The derivatives of native lignin herein may be obtained by:

(a) pulping a fibrous biomass feedstock with an organic solvent/water solution, (b) separating the cellulosic pulps or pre-treated substrates from the pulping liquor or pre-treatment solution, (c) recovering derivatives of native lignin.

The organic solvent may be selected from short chain primary and secondary alcohols, such as such as methanol, ethanol, propanol, and combinations thereof. For example, the solvent may be ethanol. The liquor solution may comprise about 20%, by weight, or greater, about 30% or greater, about 50% or greater, about 60% or greater, about 70% or greater, of ethanol.

Step (a) of the process may be carried out at a temperature of from about 100° C. and greater, or about 120° C. and greater, or about 140° C. and greater, or about 160° C. and greater, or about 170° C. and greater, or about 180° C. and greater. The process may be carried out at a temperature of from about 300° C. and less, or about 280° C. and less, or about 260° C. and less, or about 240° C. and less, or about 220° C. and less, or about 210° C. and less, or about 205° C. and less, or about 200° C. and less.

Step (a) of the process may be carried out at a pressure of about 5 atm and greater, or about 10 atm and greater, or about 15 atm and greater, or about 20 atm and greater, or about 25 atm and greater, or about 30 atm and greater. The process may be carried out at a pressure of about 150 atm and less, or about 125 atm and less, or about 115 atm and less, or about 100 atm and less, or about 90 atm and less, or about 80 atm and less.

The fibrous biomass may be treated with the solvent solution of step (a) for about 1 minute or more, about 5 minutes or more, about 10 minutes or more, about 15 minutes or more, about 30 minutes or more. The fibrous biomass may be treated with the solvent solution of step (a) at its operating temperature for about 360 minutes or less, about 300 minutes or less, about 240 minutes or less, about 180 minutes or less, about 120 minutes or less.

The pH of the pulp liquor may, for example, be from about 1 to about 6, or from about 1.5 to about 5.5.

The weight ratio of liquor to biomass may be any suitable ratio. For example, from about 4 or 5:1 to about 15:1, from about 5.5:1 to about 10:1; from about 6:1 to about 8:1.

The lignin derivatives herein may, for example, have an aliphatic hydroxyl content of from about 0.1 mmol/g to about 8 mmol/g; about 0.4 mmol/g to about 7 mmol/g; about 0.6 mmol/g to about 6.5 mmol/g; about 0.8 mmol/g to about 6 mmol/g.

The term "aliphatic hydroxyl content" refers to the quantity of aliphatic hydroxyl groups in the lignin derivatives and is the arithmetic sum of the quantity of primary and secondary hydroxyl groups (OHal=OHpr+OHsec). The aliphatic hydroxyl content can be measured by quantitative $^{13}C$ high resolution NMR spectroscopy of acetylated and non-acetylated lignin derivatives, using, for instance, 1,3,5-trioxane and tetramethyl silane (TMS) as internal reference. For the data analysis "BASEOPT" (DIGMOD set to baseopt) routine in the software package TopSpin 2.1.4 was used to predict the first FID data point back at the mid-point of $^{13}C$ r.f. pulse in the digitally filtered data was used. For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^{1}H$, 150.90 MHz for $^{13}C$). The spectrometer was coupled with a Bruker QNP cryoprobe (5 mm NMR samples, $^{13}C$ direct observe on inner coil, $^{1}H$ outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h.

The present lignin derivatives may have any suitable phenolic hydroxyl content such as from about 2 mmol/g to about 8 mmol/g. For example, the phenolic hydroxyl content may be from about 2.5 mmol/g to about 7 mmol/g; about 3 mmol/g to about 6 mmol/g.

The present lignin derivatives may have any suitable number average molecular weight (Mn). For example, the Mn may be from about 200 g/mol to about 3000 g/mol; about 350 g/mol to about 2000 g/mol; about 500 g/mol to about 1500 g/mol.

The present lignin derivatives may have any suitable weight average molecular weight (Mw). For example, the Mw may be from about 500 g/mol to about 5000 g/mol; about 750 g/mol to about 4000 g/mol; about 900 g/mol to about 3500 g/mol.

The present lignin derivatives may have any suitable polydispersity (D). For example, the D may be from about 1 to about 5; from about 1.2 to about 4; from about 1.3 to about 3.5; from about 1.4 to about 3.

The present lignin derivatives are preferably hydrophobic. Hydrophobicity may be assessed using contact angle measurements.

The present lignin derivatives may comprise alkoxy groups. For example, the present lignin derivatives may have an alkoxy content of 2 mmol/g or less; about 1.4 mmol/g or less; about 1.2 mmol/g or less; about 1 mmol/g or less; about 0.8 mmol/g or less; about 0.7 mmol/g or less; about 0.6 mmol/g or less; about 0.5 mmol/g or less; about 0.4 mmol/g or less; about 0.3 mmol/g or less. The present lignin derivatives may have an alkoxy content of 0.001 mmol/g or greater, about 0.01 mmol/g of greater, about 0.05 mmol/g or greater, about 0.1 mmol/g or greater.

The present lignin derivatives may comprise ethoxy groups. It has been found that derivatives of native lignin having an ethoxy content of 0.45 mmol/g or greater result in PF-resins having acceptable bond-strengths. For example, about 0.5 mmol/g or greater; about 0.6 mmol/g or greater; about 0.7 mmol/g or greater; about 0.8 mmol/g or greater; about 0.9 mmol/g or greater; about 1 mmol/g or greater; about 1.1 mmol/g or greater; about 1.2 mmol/g or greater. The present lignin derivatives may, for example, have an ethoxy content of about 3.75 mmol/g or less; 3.5 mmol/g or less; 3.25 mmol/g or less; 3 mmol/g or less; 2.75 mmol/g or less; 2.5 mmol/g or less; 2.25 mmol/g or less; 2 mmol/g or less; 1.9 mmol/g or less; 1.8 mmol/g or less; 1.7 mmol/g or less; 1.6 mmol/g or less; 1.5 mmol/g or less; 1.4 mmol/g or less; 1.3 mmol/g or less.

The present lignin derivatives may comprise other alkoxy groups apart from ethoxy groups such as $C_1$-$C_6$ alkoxy groups; $C_1$-$C_4$ alkoxy groups; $C_1$-$C_3$ alkoxy groups; methoxy and/or propoxy.

Quantification of the alkoxy groups can be performed using high resolution $^{13}$C NMR spectroscopy. For example, quantification of ethoxyl groups can be performed by high resolution $^{13}$C NMR spectroscopy. Identification of ethoxyl groups can be confirmed by 2D NMR HSQC spectroscopy. 2D NMR spectra may be recorded by a Bruker 700 MHz UltraShield Plus standard bore magnet spectrometer equipped with a sensitive cryogenically cooled 5 mm TCI gradient probe with inverse geometry. The acquisition parameters are the following: standard Bruker pulse program hsqcetgp, temperature of 298 K, a 90° pulse, 1.1 sec pulse delay (dl), and acquisition time of 60 msec.

Quantification of ethoxyl groups was performed using quantitative $^{13}$C NMR spectroscopy. Identification of ethoxyl groups was confirmed by 2D NMR HSQC spectroscopy. 2D NMR spectra were recorded by a Bruker 700 MHz UltraShield Plus standard bore magnet spectrometer equipped with a sensitive cryogenically cooled 5 mm TCI gradient probe with inverse geometry. The acquisition parameters were as follow: standard Bruker pulse program hsqcetgp, temperature of 298 K, a 90° pulse, 1.1 sec pulse delay (dl), and acquisition time of 60 msec.

The derivatives of native lignin herein may be incorporated into resin compositions as epoxy resins, urea-formaldehyde resins, phenol-formaldehyde resins, polyimides, isocyanate resins, and the like. The lignin derivatives herein are particularly useful in phenolic resins.

Phenol-formaldehyde resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol) or a basic catalyst such as sodium hydroxide. To prepare the so-called "high ortho" novolac resins, the strong acid catalyst is typically replaced by a divalent metal oxide (e.g. MgO and ZnO) or an organic acid salt of a divalent metal (e.g. zinc acetate or magnesium acetate) catalyst system. The resins so-produced are thermoplastic, i.e., they are not self-crosslinkable. Such novolac resins are converted to cured resins by, for example, reacting them under heat with a crosslinking agent, such as hexamine (also called hexa or hexamethylenetetramine), or for example, by mixing them with a solid acid catalyst and paraformaldehyde and reacting them under heat. Novolac resins also may be cured with other cross linkers such as resoles and epoxies. The lignin derivative may be mixed with phenol at any suitable ratio. For example, a lignin:phenol weight ratio of about 1:10 to about 10:1, about 1:8 to about 8:1, about 1:6 to about 6:1, about 1:5 to about 5:1, about 1:4 to about 4:1, about 1:3 to about 3:1, about 1:2 to about 2:1, about 1:1. The lignin derivative may comprise any suitable amount of the total resin composition. For example, from about 1%, by weight, or greater, about 0.5% or greater, about 10% or greater, about 20% or greater, about 30% or greater, about 35% or greater, about 40% or greater, of the total resin composition. The lignin derivative may comprise from about 80%, by weight, or less, about 60% or less, about 50% or less, of the total resin composition. The resin compositions may comprise a variety of other optional ingredients such as adhesion promoters; biocides (e.g. bactericides, fungicides, and moldicides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; foaming agents; defoamers; hardeners; odorants; deodorants; antifouling agents; viscosity regulators; waxes; and combinations thereof.

The present disclosure provides binder compositions comprising any suitable amount of MDI and any suitable amount of lignin derivative. For example, the binder compositions may comprise about 0.1% to about 25%, about 1% to about 15%, about 3% to about 10%, of lignin derivative by weight of the total binder composition.

The present disclosure provides a method of incorporating derivatives of native lignin in compositions comprising MDI. In particular, the method comprises:
  a) providing a composition comprising derivatives of native lignin in a suitable solvent;
  b) providing a resin composition comprising MDI;
  c) mixing the compositions; and
  d) removing the solvent.

The present method provides for the modification of a MDI adhesive resin (usually a liquid) with an extracted lignin (usually a solid, dried before use) to form a relatively stable liquid MDI—lignin adhesive resin. The lignin may be dissolved in a suitable solvent such as acetone. The resulting solution may then be mixed with liquid MDI resins at a predetermined ratio. The solvent may then be extracted by, for example, vacuum distillation at low temperatures. During the distillation, MDI reacts with the lignin to form a relatively homogenous and stable MDI-lignin resin system. The solvent may be recovered and reused.

The present compositions may be incorporated into any suitable fibreboard or similar material. For example, low density fibreboard (LDF), medium density fibreboard (MDF), high density fibreboard (HDF), strawboard & other agricultural fibre/particle boards, oriented strand board (OSB), particle board, termite-resistant OSB made with a pMDI resin and borate compounds, termite-resistant MDF made with a pMDI resin and borate compounds, wood fibre insulation board (WFIB), polyurethane foams, and the like. The present compositions have be useful in foundry resins.

The present disclosure provides a method for producing a fibreboard comprising:
  a) providing fibres to a blowline;
  b) providing a binder comprising polymeric MDI and a derivative of native lignin;
  c) treating the fibres with the binder;
  d) preferably at least partially drying the treated fibres; and
  e) pressing the treated fibres to form a fibreboard.

Fibreboard is typically manufactured via a multi-step process. Wood chips, or other suitable materials, are fed into a digester where they are exposed to steam and/or high pressures in order to soften them. The treated material is then fed into a refiner where mechanical forces separate the component fibres. The fibres exit the refiner via a "blowline" where they are transported in steam. Typically, binders are added to the fibres in the blowline. The hot, moist conditions in the blowline are such that the isocyanates rapidly react with the water to form polyureas—that is, they "precure".

Typically the blowline deposits the treated fibres in a dryer, and then into pressing devices which produce the panels. Ideally, polymerization of the binder into its final thermoset form would take place in the press, not prior to pressing the fibreboard into its final form. However, because isocyanates are so reactive it is likely that a significant amount of isocyanate is converted to polyurea prior to pressing. This can lead to the formation of solids, which foul the blowline or the dryer. Also, pre-polymerization renders a significant portion of the binder inactive, reducing bonding efficiency. Furthermore, pre-cure can lead to structuring of the surface of the panel before pressing. This can lead to "crashing" of the surface during pressing and to a correspondingly lower performance characteristics such as MOR and MOE.

The preferred fibreboard products are manufactured from wood fibres, although other cellulosic fibres may also be used, including those manufactured from agricultural products.

The present disclosure provides a method of forming fibreboard, and particularly medium density fibreboard. Processes for production of medium density fibreboard are well known and a process is described, generally, below.

In producing medium density fibreboard, a polyisocyanate resin is applied directly to the hot and wet fibre material in the blowline out of the refiner of a fibreboard manufacturing plant. Generally, the material is first screened to remove oversized and undersized material, e.g., fines and dirt. The material may also be subjected to a washing step.

The material is conveyed to storage bins that feed pressurized digester-refiner systems. The refiners refine the raw material into fibre under steam pressure. The material passes from the steam-pressurized digester into the refining section while still under pressure, and this pressure is maintained during the refining. A digester is provided for pre-steaming of the raw material. Advantageously, molten wax is added to the material as they are fed to the digester. Generally, the material is steamed in the digester for about five to ten minutes at a pressure of about 550 kPa to 830 kPa.

As the material emerges from the digester, it passes through a refiner, which is also operated under steam pressure. The material is shredded into fibres in the refiner and then blown through an orifice (i.e., the blow-valve) out of the refiner into the "blowline". Typically, the steam pressure in the refiner can be from about 550 kPa to 1030 kPa, with temperatures ranging from about 140° C. to 205° C. The fibres which emerge from the refiner into the blowline generally have a moisture content of 50% or higher, by weight, based on the total solids weight, and a temperature of at least about 100° C. to 204° C. (usually above about 118° C.).

The present compositions may be introduced into the blowline to treat the hot fibre. For example the binder may be added to the material as it emerges from the refiner.

After refining, the material is conveyed through the blowline into a flash tube dryer, where the fibre moisture content is reduced to about 2% to 20%, by weight. Typically, the treated fibre is in an air stream tube dryer for about 30 seconds, during which time it is at a temperature of about 38° C. to 260° C.

After refining, treating with the binder, and drying, the fibre and air are separated via a separator air cyclone. Next, the fibre is transported to mechanical formers that uniformly lay down the fibre on to a moving 'forming line'.

The material can be treated in a pre-compressor to make it easier to handle. After pre-compression, the material is cut into desired lengths and fed into a conventional boardforming press, such as a typical medium density fibreboard press having multiple steam or oil heated platens, or a continuous press which consolidates the material between two opposing steel belts. The press consolidates and compresses the material to the desired thickness while the heat cures the binder composition. Typically, during the pressing operation the material is generally heated to a temperature of about 121° C. to 232° C. and compressed at about 690 kPa to 6900 kPa of pressure. Pressing times are typically about 2 to 10 minutes.

The compositions of the present disclosure may be added to the fibre material at any suitable quantity. For example, from about 0.5% to about 25%, from about 1% to about 15%, from about 2% to about 10%, from about 3% to about 8%, by weight based on the dry weight of the fibre material.

MDF produced according to the present disclosure has a good modulus of rupture (MOR) and modulus of elasticity (MOE) as well as an acceptable internal bond (IB) strength.

EXAMPLES

Example 1

MDI/Lignin Production

Two batches of 10 g of powdered lignin derivative are dissolved in two aliquots of 50 g of acetone to form 20% wt./wt. solutions. 100 g of MDI (Rubinate 1780) is then mixed into one solution and 200 g of MDI (Rubinate 1780) is mixed into the other. The solutions are then subjected to vacuum distillation at room temperature for 2 hours. This removes 95% of the acetone which can be stored and re-used. The two compositions are stored and their viscosities measured over a period of several days (Table 1). The results indicate that the mixtures are not entirely stable but are not so unstable as to be unusable.

TABLE 1

The viscosity and stability of the MDI-lignin resins

| | Viscosity (mPa · s) | |
|---|---|---|
| Storage time | 5% lignin mix | 10% lignin mix |
| 0 | 600 | 1600 |
| 24 h | 780 | 3600 |
| 6 days | 880 | 9300 |
| 10 days | — | 11250 |
| 17 days | 1350 | — |

In addition, 5 g and 10 g of hardwood lignin powder are directly mixed with 100 g of MDI resin (Rubinate 1780). The suspensions appear stable for at least 24 hours, but separation or precipitation occurs over an extended period of time.

A sample of the 5% MDI-lignin mixture manufactured using acetone, and one sample each from the 5% and 10% MDI-lignin compositions made via direct mixing, were used to manufacture a medium density fibreboard (MDF) using a standard blowline. The three resultant boards were measured for their shear strength (Table 2) according to the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings 30th Annual Meeting of The Adhesion Society, Inc., Feb. 18-21, 2007, Tampa Bay, Fla., USA).

TABLE 2

Shear strength of the mixes (yellow birch veneer, thickness: 1.56 mm)

| Resin mix | Strength (MPa) 150° C., 90 s | 200° C., 90 s |
|---|---|---|
| 5% lignin (acetone solution) mixed MDI | 3.3 (1.2) | 5.4 (0.7) |
| 5% lignin directly mixed with MDI | 4.0 (0.6) | 5.8 (0.8) |
| 10% lignin directly mixed with MDI | 4.3 (1.1) | 7.0 (1.9) |

Further MDI-bonded MDF panels were made at pilot scale. Wood fiber, which was dry and unresinated, was sourced from a Canadian MDF mill. In a fiberboard pilot plant, a weighted amount of the wood fiber was blended with a predetermined amount of pMDI resin or lignin-modified pMDI resin and a predetermined amount of emulsion wax in an air-suspension tube blender. Using the resulting resinated wood fiber, a homogenous fiber mat was constructed in a 710 mm×710 mm forming box with Telflon sheets on top and bottom of the mat, which was then hot pressed into a MDF panel by a Dieffenbacker press (864 mm×864 mm) equipped with a PressMan monitoring system.

Wood species: SPF

Fiber type: mechanically refined with a moisture content of about 8.5%

Control resin: RUBINATE 1780 (pMDI) at 4% add-on rate (dry wood basis)

Experimental resin: lignin—MDI containing 5% lignin at 4% add-on rate (dry wood basis)

Wax: emulsion wax (58% solids) at 0.5% add-on rate (dry wood basis)

Moisture content of blended fiber: 6.5%-7.5%

Target panel density: 768 kg/cu. m

Target panel thickness: 9.5 mm

Press temperature: 182 C (360 F)

Press time: 280 seconds

Pressing method: Press fast closed to 15% above target panel thickness and then slow closed to target thickness over 60 seconds, following by holding and degassing.

The resulting MDF panels were conditioned under ambient conditions for 7 days, and then tested for vertical density profile, average density, modulus of elasticity, modulus of rupture, internal bond strength, and thickness swell and water absorption after 24-hour water soak and compared to MDF made with MDI alone, and to the American National Standard Institute ANSI STD A208.2-2003 (Table 3).

Example 2

Further testing was performed to compare OSB panel performance for a lignin-phenol-formaldehyde resin (LPF) and a commercial phenol-formaldehyde (PF) resin as adhesives for OSB face layers and to evaluate the feasibility of replacing commercial pMDI resin in OSB core layers with 30%, 40% and 50% LPF resins.

OSB Panel Manufacturing:

| | | Face | Core | |
|---|---|---|---|---|
| Group No. | Resin type | Resin solids add-on rate (%) | pMDI solids add-on rate (%) | Lignin-PF solids add-on rate (%) |
| 1 | Commercial PF | 3.00 | 2.00 | 0 |
| 2 | Lignin-PF | 3.00 | 2.00 | 0 |
| 3 | Commercial PF | 3.00 | 1.40 | 0.90 |
| 4 | Commercial PF | 3.00 | 1.20 | 1.20 |
| 5 | Commercial PF | 3.00 | 1.00 | 1.50 |

Wood species: Aspen

OSB strands: screened and dried to 2% moisture content.

Target mat moisture: 6%-7%

Face/core ratio: 50/50

Panel thickness: 7/16"

Panel dimension: 4'×8'×7/16"

Target density: 38 lb/ft³

Face resin: PF or Ligin-PF at 3% solids add-on (warmed to 30° C. before blending)

Core resin: pMDI/lignin-PF (100:0, 70:30×1.5, 60:40×1.5 and 50:50×1.5)

E-wax: EW58S at 1% solids add-on (58% solids diluted with water to 50% solids)

Press temperature: 215° C.

Press cycle time: 155 seconds

Hot stacking: Yes

Replicates: 4 for each group

Total number of panels produced: 20

Panel Test Results:

Concentrated static load 4-point tests according to the American PS-2 standard

TABLE 3

| Resin Type | Resin % | Press Temp (° F.) | Press Time (sec.) | D (lb/ft³) | IB (psi) | IB/D | MOR (psi) | MOE (Mpsi) | WA (%) | TS (%) |
|---|---|---|---|---|---|---|---|---|---|---|
| MDI | 4.0 | 360 | 280 | 48.6 | 204.3 ± 24.3 | 4.20 | 5,135 ± 437 | 0.468 ± 0.023 | 24.5 ± 1.8 | 15.0 ± 1.6 |
| MDI-Lignin | 4.0 | 360 | 280 | 48.6 | 161.0 ± 23.5 | 3.31 | 5,731 ± 434 | 0.528 ± 0.038 | 24.7 ± 2.2 | 17.4 ± 0.9 |
| American ANSI STD A208.2 (2003) | N/A | N/A | N/A | N/A | 44-152 | N/A | 3,500 | 0.350 | N/A | N/A |

| Group | 1 Commercial PF | 2 Lignin - PF | 3 Commercial PF | 4 Commercial PF | 5 Commercial PF |
|---|---|---|---|---|---|
| Surface Resin Loading | 3.00% | 3.00% | 3.00% | 3.00% | 3.00% |
| Core Resin Loading | | | Lignin* - PF | Lignin* - PF | Lignin*- PF |
| | pMDI - R1840 | pMDI - R1840 | pMDI - R1840 0.90% | pMDI - R1840 1.20% | pMDI - R1840 1.50% |
| | 2.00% | 2.00% | 1.40% | 1.20% | 1.00% |
| Density @ test point (10" × 10") | 39.0 | 39.3 | 39.3 | 39.2 | 39.4 |
| std | 1.28 | 1.28 | 2.04 | 1.44 | 2.67 |
| Thickness (inch) | 0.43 | 0.434 | 0.44 | 0.44 | 0.43 |
| std | 0.01 | 0.01 | 0.01 | 0.01 | 0.01 |
| Deflection (inch) | 0.38 | 0.394 | 0.38 | 0.37 | 0.38 |
| std | 0.03 | 0.02 | 0.03 | 0.03 | 0.04 |
| Ultimate Load (lbf) | 444 | 386 | 432 | 433 | 402 |
| std | 38.1 | 36.8 | 59.1 | 46.6 | 44.6 |
| fail/pass | 1/15 | 12/4 | 4/12 | 4/12 | 7/9 |
| APA PRP-108 Performance Criteria: | (2001) | | | | |
| Minimum Ultimate Load - | | 400 lbf | | | |
| Maximum Deflection @ 200 lbf | | 0.500 in | | | |

*HPL ™ lignin (available from Lignol Innovations, Burnaby, Canada, V5G 3L1)

The average density, vertical density profile, internal bond strength (IB), modulus of rupture (MOR), modulus of elasticity (MOE), and thickness swelling (TS) and water absorption (WA) was measured after 24-hour water soak.

| Group | MOR (parallel) (psi) | MOE (parallel) (Mpsi) | IB (psi) | IB/Core-density | Density (lb/ft$^3$) | TS (edge) (%) | WA (%) |
|---|---|---|---|---|---|---|---|
| 1 | 4320 | 0.861 | 37.4 | 0.52 | 37.7 | 26.0 | 49.2 |
| 2 | 3574 | 0.801 | 27.7 | 0.37 | 38.6 | 37.9 | 62.9 |
| 3 | 4164 | 0.878 | 35.7 | 0.48 | 38.7 | 27.7 | 48.9 |
| 4 | 4539 | 0.905 | 28.1 | 0.40 | 37.8 | 27.7 | 51.6 |
| 5 | 4276 | 0.908 | 25.3 | 0.36 | 39.3 | 28.8 | 54.5 |

The above results demonstrate that it is feasible to use LPF resin at 40% phenol replacement and that pMDI is an excellent cross-linker for LPF.

What is claimed is:

1. A binder composition comprising liquid methylene diphenyl diisocyanate (MDI) and a derivative of native lignin, wherein the binder composition does not have any other liquid solvent, the derivative of native lignin has a phenolic hydroxyl content of from about 2 mmol/g to about 8 mmol/g and a polydispersity of from about 1 to about 5, wherein the composition is a homogeneous and stable liquid MDI-lignin composition.

2. The binder composition according to claim 1 wherein the derivative of native lignin further has an aliphatic hydroxyl content of from about 0.1 mmol/g to about 8 mmol/g.

3. The binder composition according to claim 1 wherein the derivative of native lignin further has an aliphatic hydroxyl content of from about 0.6 mmol/g to about 6.5 mmol/g.

4. The binder composition according to claim 1 comprising from about 0.1% to about 25%, by weight, of the derivative of native lignin.

5. The binder composition according to claim 1 comprising from about 50% to about 99%, by weight, of methylene diphenyl diisocyanate.

6. A method of producing the binder composition according to claim 1, said method comprising:
   a. providing a composition comprising the derivative of native lignin in a suitable solvent;
   b. providing a resin composition comprising the liquid methylene diphenyl diisocyanate;
   c. mixing the compositions of a and b; and
   d. removing the solvent.

7. A method of producing a fibreboard, comprising the steps of:
   a. providing fibres to a blowline;
   b. providing the binder composition according to claim 1;
   c. treating the fibres with the binder composition;
   d. at least partially drying the treated fibres; and
   e. pressing the treated fibres to form a fibreboard.

* * * * *